United States Patent [19]

Minobe et al.

[11] Patent Number: 4,707,017
[45] Date of Patent: Nov. 17, 1987

[54] ADJUSTABLE HEIGHT WINDSHIELD APPARATUS FOR MOTORCYCLES

[75] Inventors: Shinichi Minobe; Tatsuo Ueda, both of Shizuoka, Japan

[73] Assignee: Koito Seisakusho Co., Ltd., Tokyo, Japan

[21] Appl. No.: 1,214

[22] Filed: Jan. 6, 1987

[30] Foreign Application Priority Data

Jan. 13, 1986 [JP] Japan .................. 61-4680
Jan. 13, 1986 [JP] Japan .................. 61-4681
Jan. 14, 1986 [JP] Japan .................. 61-5999
Jan. 14, 1986 [JP] Japan .................. 61-6000

[51] Int. Cl.$^4$ .............................. B62J 17/04
[52] U.S. Cl. ..................... 296/78.1; 296/84 A; 296/84 G; 280/289 S; 49/352; 74/216.3; 74/501 R
[58] Field of Search ............ 296/78 R, 78.1, 84 R, 296/84 A, 84 D, 84 G, 89, 201; 49/352, 428, 436; 280/289 S; 74/216.3, 501 R

[56] References Cited

U.S. PATENT DOCUMENTS

| 975,414 | 11/1910 | Hadka | 296/89 |
| 4,353,590 | 10/1982 | Wei-chuan | 296/78.1 |
| 4,402,642 | 9/1983 | Klancnik et al. | 74/501 R |
| 4,606,571 | 8/1986 | Fujita | 296/78.1 X |
| 4,656,780 | 4/1987 | Miyauchi et al. | 49/348 |

FOREIGN PATENT DOCUMENTS

| 8176 | 1/1985 | Japan . | |
| 449826 | 7/1936 | United Kingdom | 296/84 G |
| 1033153 | 6/1966 | United Kingdom | 49/348 |

Primary Examiner—Dennis H. Pedder
Attorney, Agent, or Firm—Browdy and Neimark

[57] ABSTRACT

For adjustably moving a motorcycle windshield up and down with respect to a motorcycle cowling, there are employed a pair of drive ball assemblies each comprising a series of rigid plastic balls strung on a length of wire. The drive ball assemblies are slidably received in respective guide tubes having a pair of windshield guide portions disposed just behind the cowling in parallel spaced relation to each other. Disposed between the windshield guide portions of the guide tubes, the windshield has its opposite sides coupled to the drive ball assemblies via longitudinal slits formed in the windshield guide portions for joint movement with the drive ball assemblies back and forth along the windshield guide portions. A pair of drive wheels are coaxially and rotatably mounted to the motorcycle frame, and preferably coupled to a reversible electric motor, for driving engagement with the balls of the drive ball assemblies. Thus, upon bidirectional rotation of the drive wheels, the drive ball assemblies slide longitudinally back and forth through the guide tubes thereby moving the windshield up and down along the windshield guide portions of the guide tubes.

17 Claims, 12 Drawing Figures

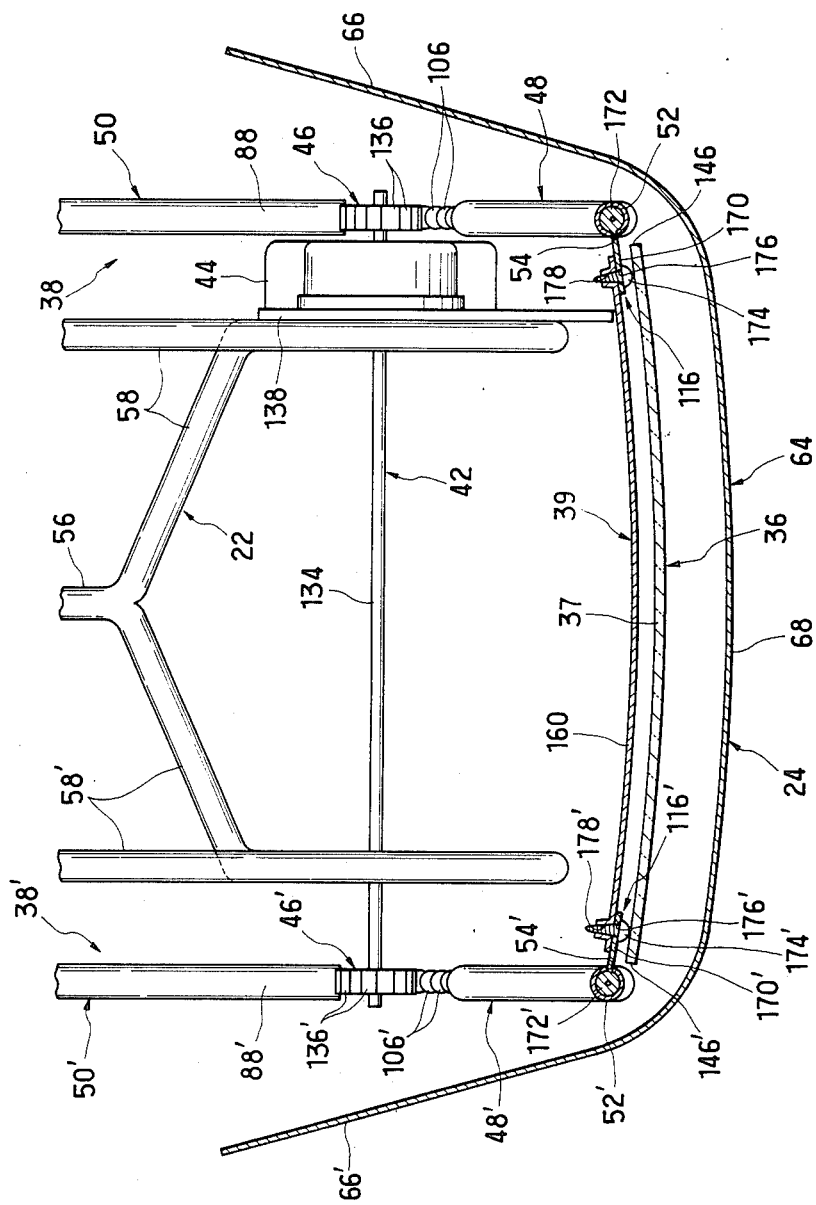

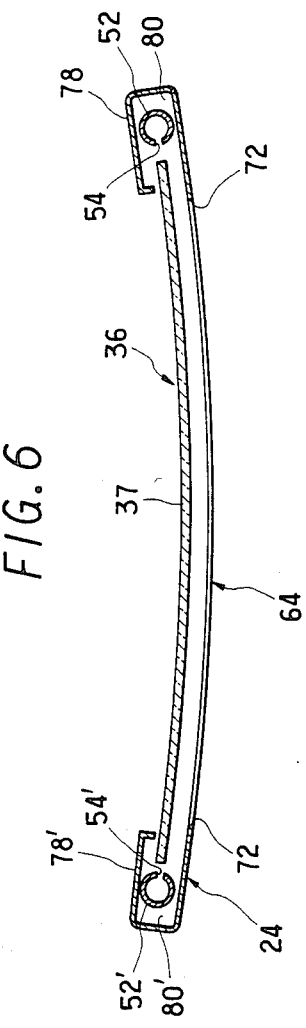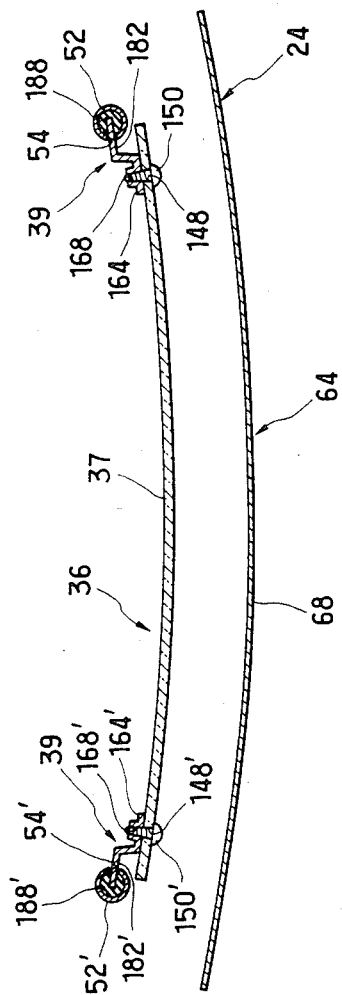

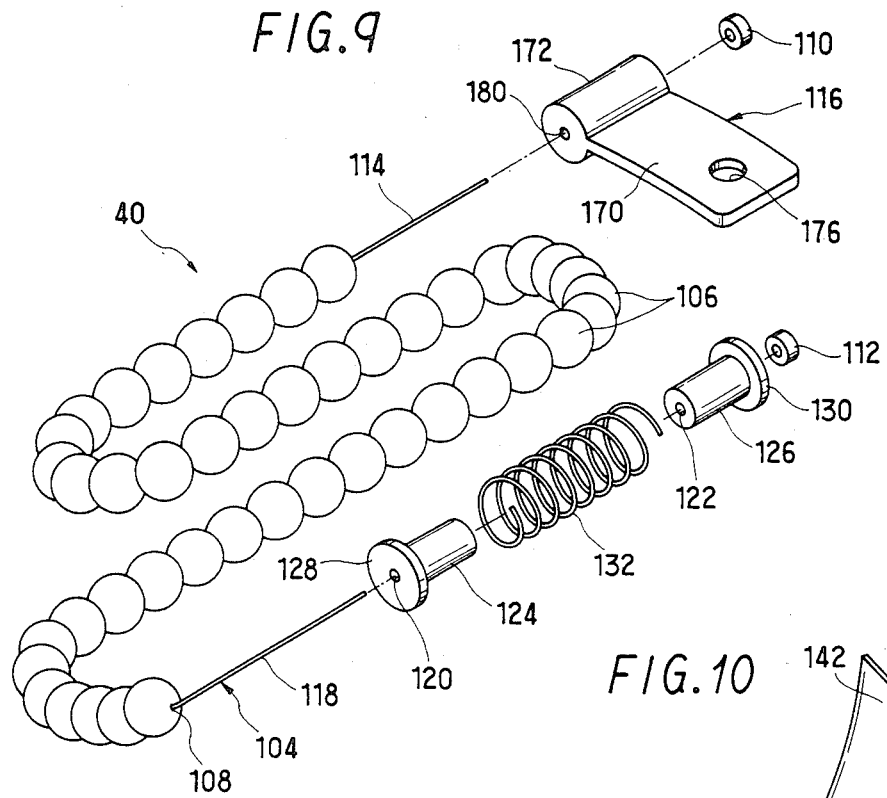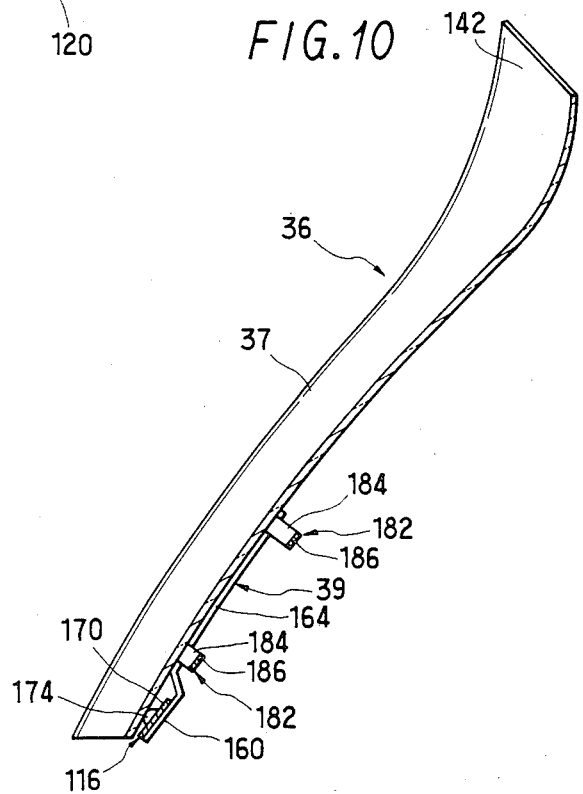

ADJUSTABLE HEIGHT WINDSHIELD APPARATUS FOR MOTORCYCLES

BACKGROUND OF THE INVENTION

This invention relates generally to windshields to be mounted on motorcycles just forwardly of the rider by way of his protection from unfavorable weather or the reduction of drag. More specifically, the invention has to do with a motorcycle windshield apparatus including facilities for continuously varying the height of the windshield with respect to the motorcycle frame.

The adjustable height windshield apparatus of this invention is not desired to be of exclusive application to any particular type or class of motorcycle. Thus the term "motorcycle" as used herein and in the claims appended hereto should be interpreted in a broad sense, inclusive of any motor vehicle operating on two or three wheels in contact with the ground, regardless of the piston displacement of the propelling engine incorporated in the vehicle.

Some motorcycles, especially two wheeled motorcycles of relatively larger engine displacement, are furnished with a windshield in combination with a cowling or fairing for the production of a smooth outline and the reduction of drag. The windshield itself is further intended to protect the rider during inclement weather. Thus, when the weather is propitious, it is desirable that the windshield be retracted or lowered to such an extent as to permit the rider to look over the same. The windshield may be raised to above eye level when the vehicle is running through adverse weather. Moreover, desirably, the windshield should be adjustable to any desired height position between the two extreme positions, depending, for instance, upon the eye level of the driver or the scope of vision sought to be commanded.

U.S. Pat. No. 4,355,838 to Hickman represents a conventional example of adjustable windshield device. This patent teaches the attachment of a pair of elongate female members to the windshield, and of a pair of male track members to the cowling. The female members, together with the windshield thereon, slide up and down along the male track members to a desired height position. Lock screws are provided for locking the male and female members together in a selected windshield position.

An objection to this known device is that the motorcycle must be at a standstill, and possibly the operator must come off the saddle, for the height adjustment of the windshield. The adjustment itself is very troublesome and time consuming, necessitating the loosening and retightening of the lock screws. Additional objection is that the male and female members are disposed some distance displaced toward the median plane of the vehicle from the opposite side edges of the windshield. Therefore, especially when the windshield is elevated, the female members affixed to the windshield obstruct the rider's field of view, besides being objectionable from an aesthetic point of view.

A more advanced adjustable windshield apparatus is described and claimed in Japanese Laid Open Patent Application No. 60-8176. This second prior art apparatus employs a pair of toothed drive tapes of flexible material in combination with a pinion in mesh with both drive tapes. The drive tapes are both secured each at one end to the bottom end of the windshield, extend downwardly therefrom in parallel spaced relation to each other, and are bent right angularly toward each other to provide horizontal portions slidably extending along guide means on the cowling. Vertically offset from each other, the horizontal portions of the two drive tapes extend over and under, respectively, the pinion in positive engagement therewith, the pinion being rotatably mounted in a central position on the cowling.

Thus, as the pinion is revolved bidirectionally, the pair of drive tapes synchronously and longitudinally travel along the guide means, causing the windshield to travel up and down with respect to the cowling. All that is required for windshield height adjustment is to turn the pinion shaft.

Despite the simplicity of construction and the ease of manipulation, this second prior art apparatus has its own weaknesses. One of these is that the drive tapes partly overlie the windshield, and that at its central portion, presenting obstacles to the forward vision of the rider just as in the first described conventional device. Another weakness is that the drive tape and pinion arrangement serves solely to move the windshield up and down; that is, additional separate means are required for guiding the up and down motion of the windshield. As a further disadvantage, an exertion of a considerable torque is required for turning the pinion shaft and hence for longitudinally displacing the pair of drive tapes. This is because the drive tapes must slide along guideways that are each bent right angularly and, moreover, because the tapes are twisted at the right angular bends.

SUMMARY OF THE INVENTION

The present invention eliminates all the noted problems encountered in the art, making it possible to adjust the height of a motorcycle windshield by means that in no way obstruct the rider's field of view and which require much less actuating force than does the comparative prior art device employing the flexible drive tapes. Further the invention enables the windshield to be guided along exactly the same path as are the means for moving the windshield up and down.

The invention may be summarized as an adjustable height windshield apparatus for a motorcycle, with the apparatus comprising a windshield to be disposed across the longitudinal plane of symmetry of the motorcycle for reciprocating movement relative to the frame means of the motorcycle along a predetermined path. A pair of guide means are rigidly mounted on both sides of the frame means. The guide means include a pair of windshield guide portions which extend along the opposite sides of the windshield and which predefine the path of the windshield. Slidable longitudinally along the respective guide means, a pair of elongate flexible drive assemblies are coupled to the opposite sides of the windshield in order to cause the displacement of the windshield along the predetermined path with the longitudinal movement of the drive assemblies along the guide means. A pair of drive wheels are rotatably mounted on the opposite sides of the frame means and operatively engaged with the respective drive assemblies in order to cause the joint longitudinal displacement of the drive assemblies back and forth along the guide means and, therefore, the travel of the windshield up and down along the windshield guide portions of the guide means.

It will be appreciated that the drive assemblies and the guide means therefor are wholly disposed on both sides of the motorcycle frame means and away from the windshield. Consequently, such means present no obstacle to the motorcycle rider's field of view forwardly of the vehicle regardless of whether the windshield is in a raised, lowered, or any intermediate position.

Preferably, each drive assembly takes the form of a series of drive balls of rigid plastic or like material strung on a length of wire or like linear flexible element. For guiding this drive ball assembly, each guide means comprises two guide tubes held end to end with a spacing therebetween to expose part of the drive ball assembly. Each drive wheel has a series of concavities defined circumferentially therein for driving engagement with the balls of the associated drive ball assembly as such balls are successively exposed at the spaced junction between the two guide tubes.

The pair of drive wheels are to be revolved bidirectionally, either manually or by being power driven. The preferred embodiment disclosed herein employs a reversible electric motor coupled to both drive wheels in axial alignment. The vehicle operator can readily activate the motor in either direction, and hence move the windshield up and down to a desired degree, while sitting on the saddle or operator's seat on the vehicle.

The two pairs of guide tubes are, of course, wholly disposed on both sides of the vehicle, where ample spaces are available for the installation of such guide means even if the windshield is of long throw and so necessitates the provision of correspondingly long guide tubes. These guide tubes may therefore be arranged without any sharp turns or small radius curves thereby permitting the drive ball assemblies to slide therethrough with a minimum of friction.

One of the two pairs of guide tubes include the windshield guide portions extending linearly along the opposite sides of the windshield and each having a slit, open toward the windshield, formed longitudinally therein. The pair of drive ball assemblies are coupled, each at one extremity, to the opposite sides of the windshield via the longitudinal slits in the windshield guide portions of one pair of guide tubes. The windshield is moved up and down along these guide portions as the noted extremities of the drive ball assemblies travel back and forth therethrough.

According to a further feature of this invention, the windshield has a pair of slider means protruding laterally from its opposite sides and slidably engaged in the windshield guide portions of one pair of guide tubes via the longitudinal slits therein. The up and down movement of the windshield is thus guided by the windshield guide portions; that is, the windshield guide portions serve the dual purpose of guiding the windshield and parts of the drive ball assemblies. No exclusive guide means for the windshield are required. As an additional advantage, those end portions of the drive ball assemblies which are coupled to the windshield are constrained to travel exactly along the path of the windshield, so that the actuating force that has been exerted on the drive ball assemblies can be fully transmitted to the windshield.

A still further feature of the invention resides in the specific construction of the slider means. Each slider means comprises one or more rigid, preferably metal made, outriggers each having a first end anchored to one side of the windshield and a second end received with clearance in one windshield guide portion through the longitudinal slit therein, and a slider of cylindrical shape formed on the second end of each outrigger and slidably engaged in the tubular windshield guide portion. The sliders, preferably molded of rubber or like elastic material, are received in the windshield guide portions without any transverse play. With the windshield so elastically supported, rather than with play between rigid mating parts as in the prior art, not only is the vibration of the windshield during vehicle travel reduced to a minimum, but also the windshield moves smoothly and noiselessly during height adjustment.

The above and other features and advantages of this invention and the manner of realizing them will become more apparent, and the invention itself will best be understood, from a study of the following description and appended claims, with reference had to the attached drawings showing the preferred embodiment of the invention.

BRIEF DESCRIPTION OF THE DRAWINGS

FIG. 5 is a fragmentary, horizontal section through the motorcycle, taken along the line V—V in FIG. 4 and showing in particular the windshield assembly and pair of guide tube means of the windshield apparatus as well as the frame of the motorcycle;

FIG. 6 is a horizontal section through the windshield apparatus, taken along the line VI—VI in FIG. 4 and showing in particular the windshield, the windshield guide portions of the guide tube means, and the cowling of the motorcycle;

FIG. 7 is also a horizontal section through the windshield apparatus, taken along the line VII—VII in FIG. 4 and showing in particular how the opposite sides of the windshield are slidably supported by the windshield guide portions of the guide tube means to be guided thereby;

FIG. 9 is an enlarged, exploded perspective view of one of the drive ball assemblies of the windshield apparatus;

FIG. 10 is a side elevation, partly sectioned for illustrative convenience, of the windshield assembly;

DESCRIPTION OF THE PREFERRED EMBODIMENT

General

Figure 1:
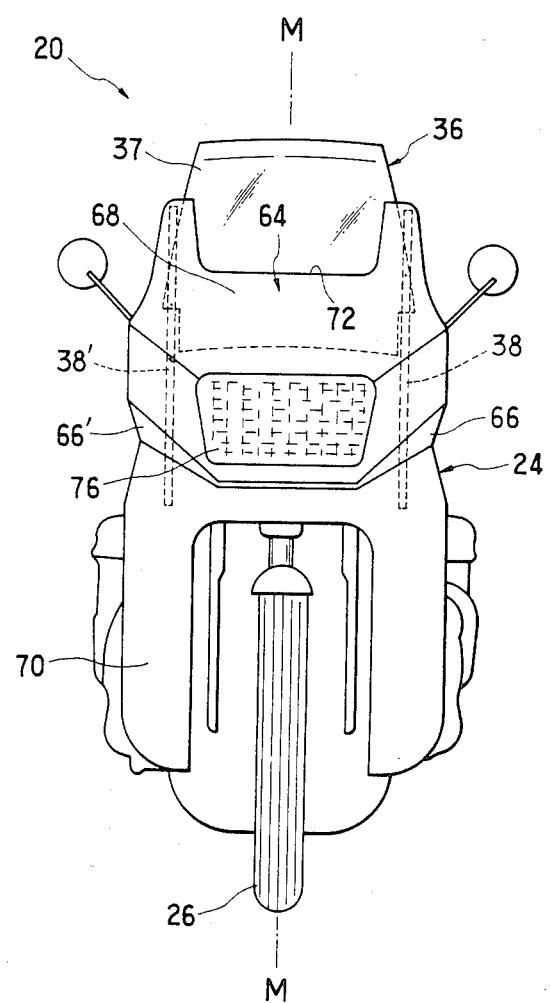
FIG. 1 is a front elevation of a two wheeled motorcycle incorporating the adjustable height windshield apparatus of this invention.

The adjustable height windshield apparatus of this invention will now be described more specifically as adapted for a two wheeled motorcycle, shown in its entirety in FIGS. 1 and 2, having a relatively large (e.g. more than 170 cubic centimeters) engine displacement. Generally designated 20, the representative motorcycle of FIGS. 1 and 2 conventionally comprises a frame, seen at 22 in FIGS. 3 and 4, with a cowling 24 rigidly mounted on and covering its front end, front 26 and rear 28 road wheels, an internal combustion engine 30 with gearbox and drive components, a gasoline tank 32, and a saddle 34.

Figure 3:
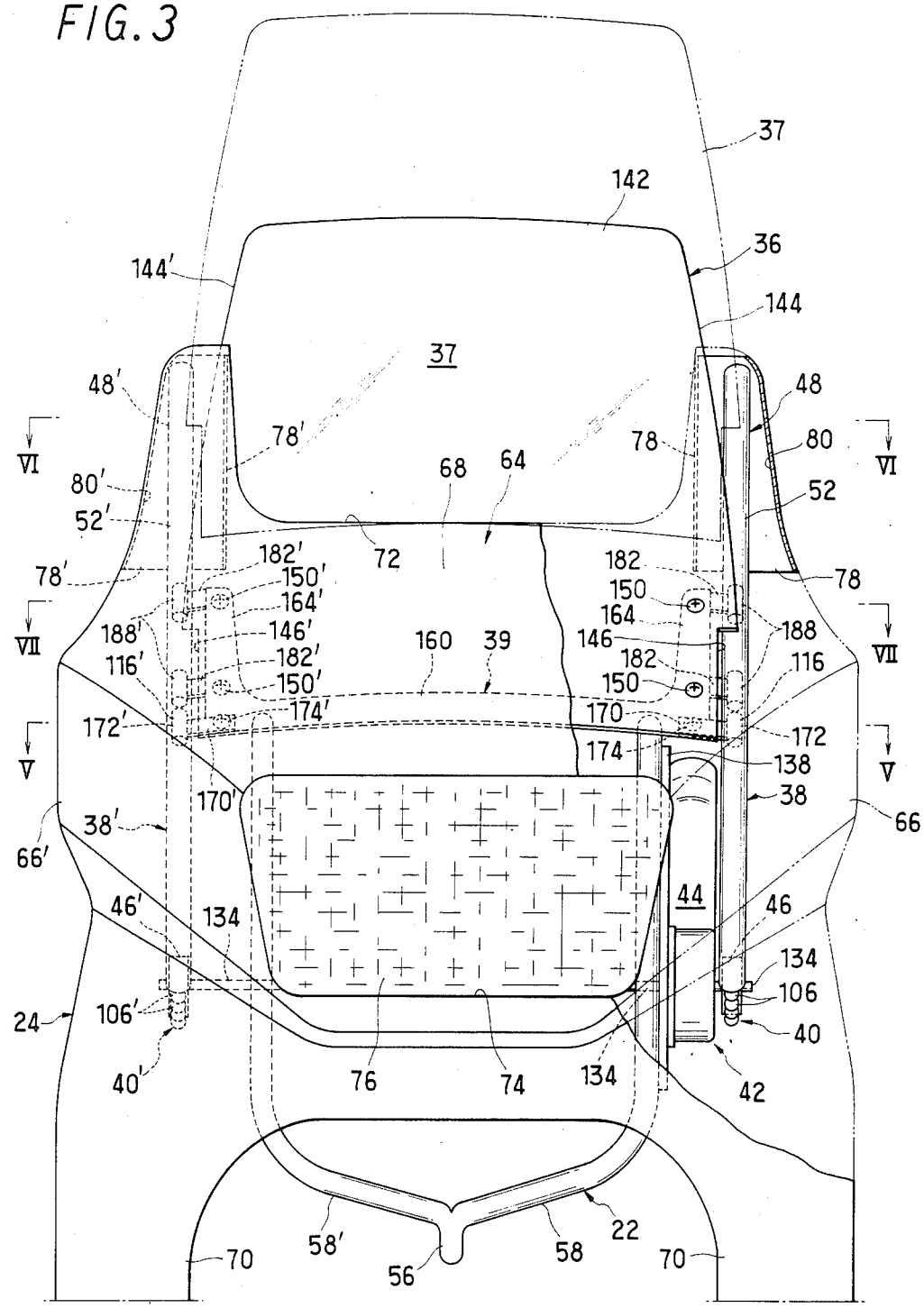
FIG. 3 is an enlarged, fragmentary side elevation, partly shown broken away and partly sectioned for clarity, of the motorcycle, the view showing some essential parts of the windshield apparatus, particularly one of the guide tube means and one of the drive ball assemblies traveling therethrough, together with the drive means for moving the drive ball assembly through the guide tube means.
Figure 4:
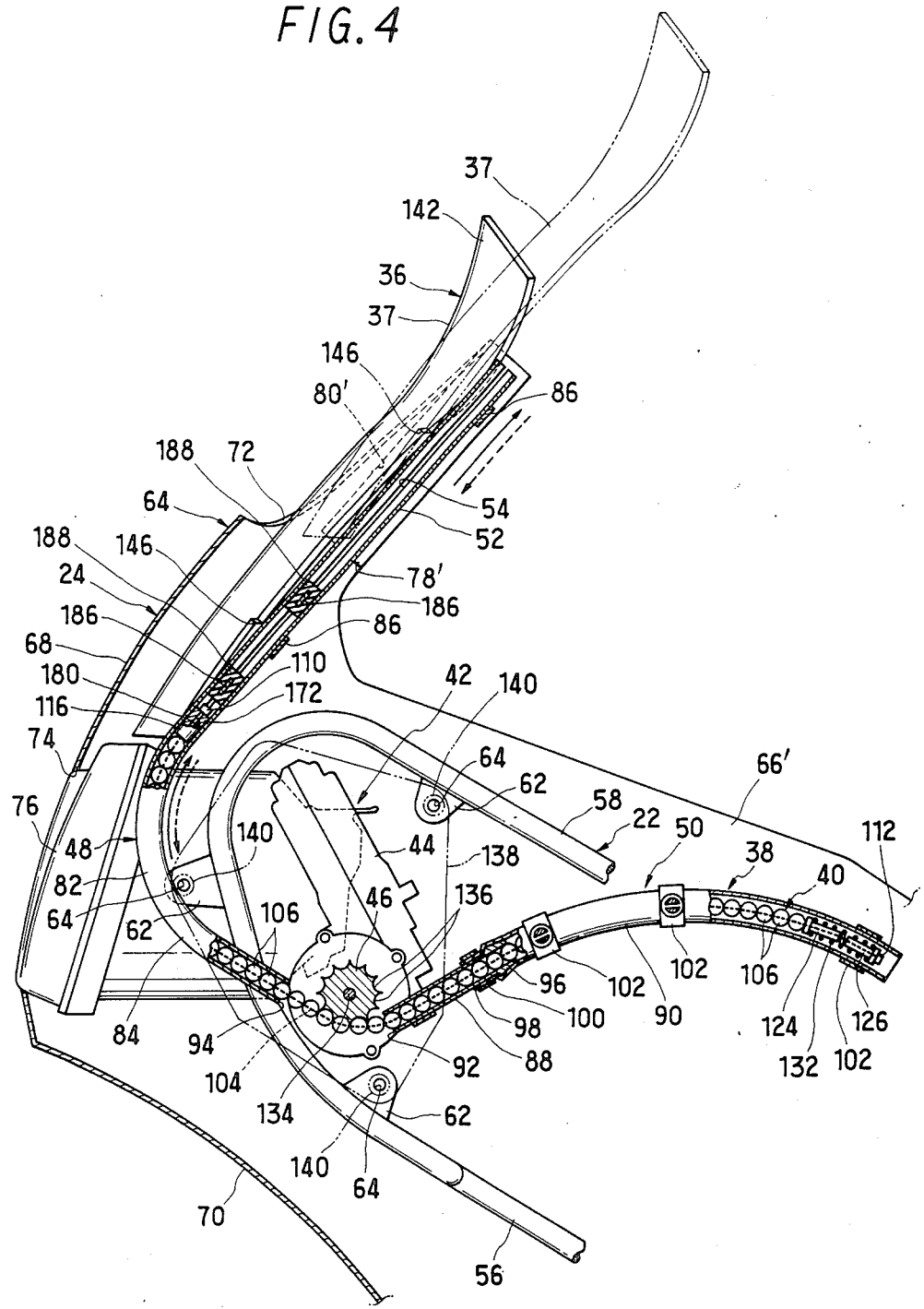
FIG. 4 is is an enlarged fragmentary front elevation, partly shown broken away for clarity, of the motorcycle, the view showing in particular the windshield assembly and pair of guide tube means of the windshield apparatus.

As illustrated fragmentarily and on an enlarged scale in FIGS. 3 and 4, the cowling 24 is provided with a windshield assembly 36 which is to be adjustably moved up and down relative to the cowling by the improved means of this invention. The windshield assembly 36 comprises a windshield 37 and a windshield frame 39 rigidly attached thereto. This windshield assembly is movable between a lowermost position indicated by the solid lines in both FIGS. 3 and 4 and an uppermost position indicated by the broken lines.

The improved means for adjustably moving the windshield assembly 36 comprise a pair of guide tube means 38 and 38', a pair of drive ball assemblies 40 and 40' slidable longitudinally through the respective guide tube means 38 and 38' and coupled to the windshield frame 39 for joint movement with the windshield assembly, and a drive mechanism 42 including a reversible electric motor drive unit 44 and a pair of coaxial drive wheels 46 and 46' in driving engagement with the respective drive ball assemblies 40 and 40' for synchronously moving the same back and forth through the guide tube means.

As will be seen also from FIG. 5, in addition to FIGS. 3 and 4, the guide tube means 38 and 38' include a first pair of guide tubes 48 and 48' and a second pair of guide tubes 50 and 50'. The two pairs of guide tubes have their ends held opposite each other with spacings therebetween to expose parts of the drive ball assemblies 40 and 40' for driven engagement with the drive wheels 46 and 46'. The first pair of guide tubes 48 and 48' include a pair of windshield guide portions 52 and 52' extending rectilinearly on both sides of the windshield 37 and slitted longitudinally at 54 and 54'. The windshield 37 has its opposite sides coupled, via the windshield frame 39, to the pair of drive ball assemblies 40 and 40' in the windshield guide portions 52 and 52', and further slidably supported in these guide portions, via the slits 54 and 54'. Thus, upon sliding movement of the drive ball assemblies 40 and 40' back and forth through the guide tube means 38 and 38', the windshield assembly 36 travels up and down along these windshield guide portions 52 and 52' of the first pair of guide tubes 48 and 48' between the two limit positions indicated in FIGS. 3 and 4.

Given hereunder is a more detailed discussion, under the respective headings, of the various parts and components of the motorcycle 20, particularly in regard to the adjustable height windshield apparatus of this invention incorporated therein. As will be understood from an inspection of FIGS. 1, 3 and 5, all the paired parts and components of the motorcycle 20 are arranged in bilateral symmetry with respect to a median plane M—M, FIG. 1, by which is meant the vertical plane passing through the centerline of the front and rear wheels 26 and 28. Accordingly, except where otherwise specified, only the left hand ones of such paired parts and components will be described in detail, and their right hand counterparts will be identified merely by priming the reference numerals used to denote the corresponding left hand parts and components, it being understood that the same description applies to the right hand counterparts.

It is also to be understood that the right and left side designations as used hereafter refer to the right and left sides, respectively, of the median plane M—M as seen from the motorcycle driver sitting normally on the saddle 34. Thus, for instance, FIG. 2 shows the left hand side of the motorcycle 20.

The following is a list of the headings under which the various parts and components of the motorcycle 20 will be discussed in detail:
I. Motorcycle Frame
II. Cowling
III. Guide Tube Means
  A. First Pair of Guide Tubes
  B. Second Pair of Guide Tubes
IV. Drive Ball Assemblies
V. Drive Mechanism for Drive Ball Assemblies
VI. Windshield Assembly
  A. Windshield
  B. Windshield Frame
VII. Connections of Windshield Assembly to Drive Ball Assemblies
VIII. Guiding of Windshield Assembly
IX. Conclusion

I. Motorcycle Frame

With reference to FIG. 3, 4 and 5, the motorcycle frame 22 is of bilateral symmetry with respect to the median plane M—M. As seen in a front view as in FIG. 3, and in a plan view as in FIG. 5, the motorcycle frame 22 is generally Y shaped, comprising a main frame member 56 lying on the median plane M—M, and a pair of divergent branch frame members 58 and 58' extending forwardly and upwardly from the front extremity of the main frame member. Further, as seen in a side view as in FIG. 4, each branch frame members 58 or 58' is bent rearwardly into the shape of a recumbent U. The branch frame members 58 and 58' have their front end portions disposed below a steering handle 60, FIG. 2, and extend forwardly beyond the steering handle.

As seen in FIG. 4, only the left hand franch frame member 58 has three mounting lugs 62 formed in longitudinally spaced apart positions thereon, with each mounting lug having a hole 64 formed therein. These mounting lugs 62 are for use in mounting the drive mechanism 42 to the motorcycle frame 22, as will be later explained in conjunction with the drive mechanism.

II. Cowling

The cowling 24 appears in all of FIGS. 1 through 7. Known also as a fairing, front cowl, etc., the cowling 24 generally faces forwardly of the motorcycle 20, comprising a front portion 64 and a pair of side portions 66 and 66', all of one piece construction. These front portion 64 and side portions 66 and 66' are all secured to the motorcycle frame 22 by means that are not shown because of their conventional nature.

Figure 2:
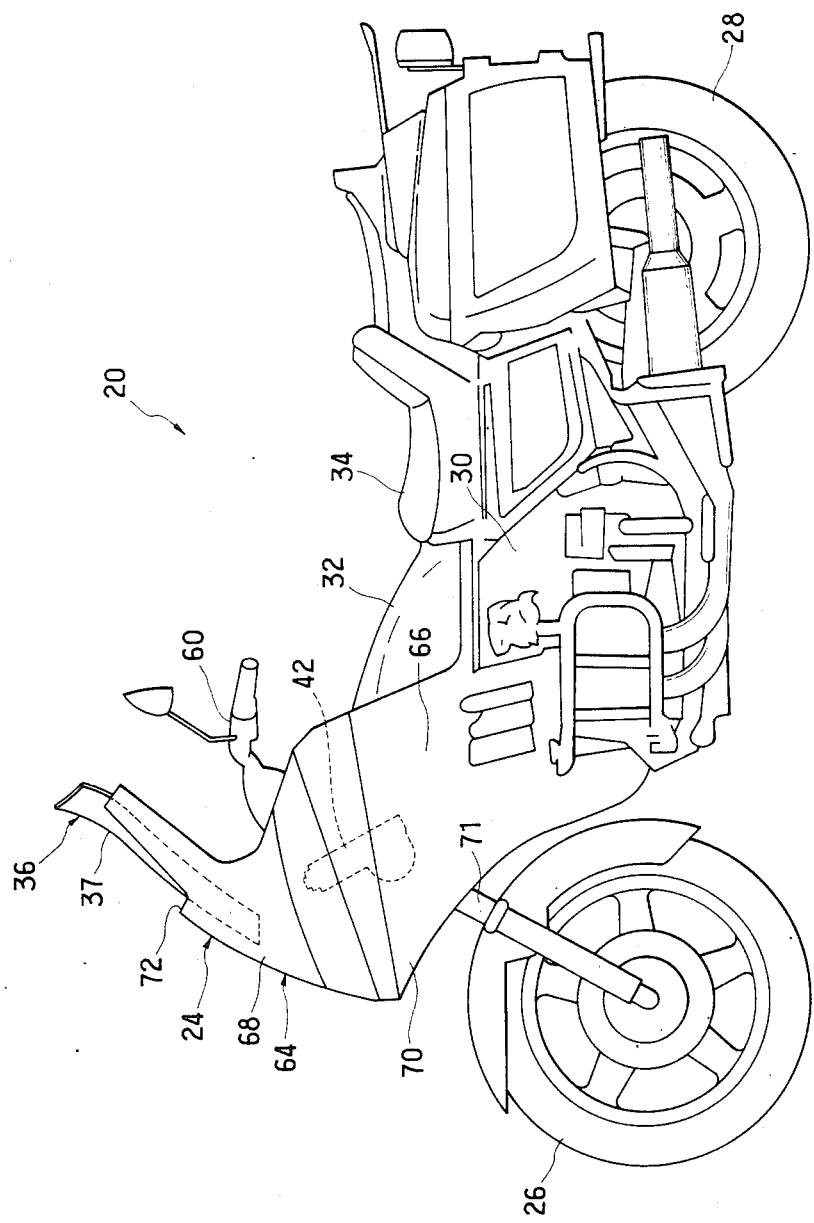
FIG. 2 is a side elevation of the motorcycle of FIG. 1.

As seen in a side view as in FIGS. 2 and 4, the front portion 64 of the cowling 24 is bent into the shape of a recumbent V, with the apex of the letter V situated slightly above the front road wheel 26, so that the front cowling portion 64 may be thought of as having an upper part 68 and a lower part 70. The upper part 68 of the cowling front portion 64 extends both upwardly and rearwardly from the noted apex to a point above, and slightly forwardly of, the steering handle 60 and is slightly convexed forwardly. Further, as seen in horizontal sections as in FIGS. 5 through 7, too, the upper part 68 of the cowling front portion 64 is slightly convexed forwardly. The lower part 70 of the cowling front portion 64 extends both downwardly and rearwardly from the noted apex to a point just behind the front road wheel 26 and is slightly concaved forwardly. FIGS. 1 and 3 indicates that the lower part 70 is bifurcated as it extends past the front fork 71, FIG. 2, of the motorcycle 20.

The pair of side portions 66 and 66' of the cowling 24 extend rearwardly from the lower part 70 of the front cowling portion 64. As best shown in FIG. 5, the side cowling portions 66 and 66' diverge apart from each other as they extend rearwardly, hiding the front part of the motorcycle frame 22 as well as the pair of guide tube means 38 and 38', drive mechanism 42, etc., of the windshield height adjusting mechanism of this invention.

As best seen in FIGS. 1 through 3, the upper part 68 of the front cowling portion 64 is recessed to provide a windshield opening 72. Generally rectangular in shape, the windshield opening 72 extends downwardly from the top of the front cowling portion 64 to a point slightly above the level of the steering handle 60. The windshield opening 72 is thoroughly closed by the windshield 70, regardless of its height, lying just behind the front cowling portion 64. The upper part 68 of the front cowling portion 64 has also defined therein a headlamp opening 74 through which is conventionally exposed a headlamp 76.

As shown in FIGS. 3 and 4, and more clearly in FIG. 6, the upper part 68 of the front cowling portion 64 has its opposite side edge portions bent rearwardly further toward each other to provide a pair of rims 78 and 78' of L shaped cross section. These L shaped rims 78 and 78' are intended to provide substantially enclosed spaces 80 and 80', open only toward each other, for accommodating at least parts of the windshield guide portions 52 and 52' of the first pair of guide tubes 48 and 48'; in other words, the L shaped rims serve to conceal the windshield guide portions. It will also be noted from FIG. 6 that the windshield 37 also has its opposite side portions received in the enclosed spaces 80 and 80' with substantial clearances.

III. Guide Tube Means

The representative guide tube means 38, the other guide tube means 38' being of identical construction as aforesaid, are disposed on the left hand side of the motorcycle frame 22 and wholly in a plane parallel to the median plane M—M, as will be seen from FIGS. 3 and 5. FIG. 4 best indicates that the guide tube means 38 comprise the first guide tube 48 and second guide tube 50 having their ends held opposite each other, with a spacing therebetween, to provide a guide passageway for the drive ball assembly 40. The windshield guide portion 52 of the firsst guide tube 48 serves the additional purpose of guiding the windshield assembly 36 in the adjustment of its height.

A. First Pair of Guide Tubes

Figure 8:
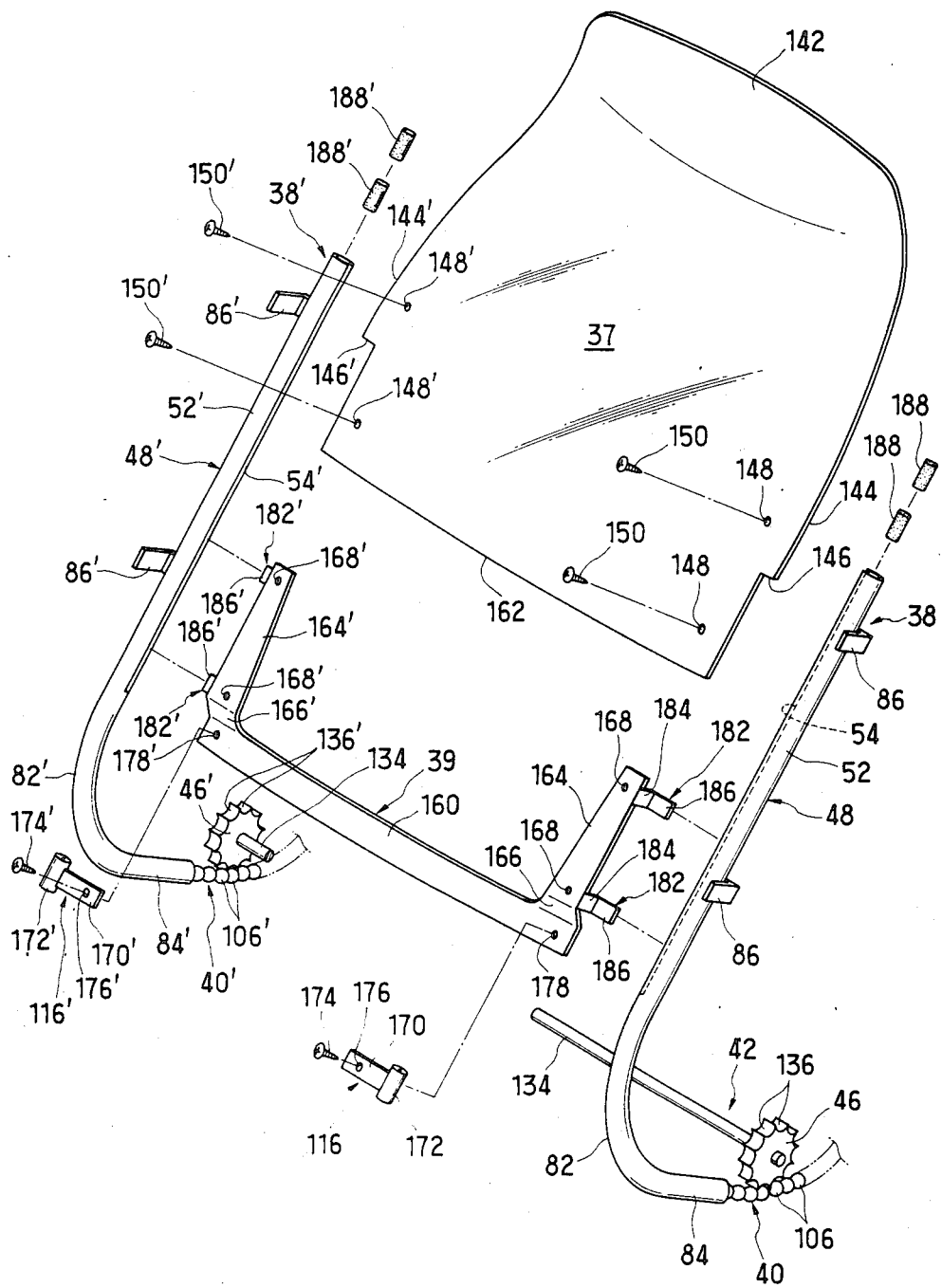
FIG. 8 is an exploded perspective view of the windshield apparatus incorporated in the motorcycle of FIGS. 1 and 2.

Although the first pair of guide tubes 48 and 48' appear in all of FIGS. 3 through 8, reference may be had principally to FIGS. 3, 4 and 8 for an easy understanding of their construction. The representative left hand one 48 of the first pair of guide tubes is generally in the shape of the mirror image of the capital J as seen in the left hand view as in FIG. 4. Thus, as indicated in both FIGS. 4 and 8, the guide tube 48 comprises the windshield guide portion 52 extending rectilinearly along one side of the front part 64 of the cowling 24, a bight portion 82 generally extending downwardly and rearwardly from the windshield guide portion, and a staright end portion 84 extending further downwardly and rearwardly from the bight portion.

FIGS. 4 and 8 show at 86 a pair of mounting brackets affixed to the windshield guide portion 52 of the first guide tube 48 for rigidly mounting the same to the cowling 24. Preferably, additional means, not shown, may be provided for rigidly mounting the first guide tube 48 to the motorcycle frame 22.

As has been set forth with reference to FIG. 6, the windshield guide portion 52 of the first guide tube 48 is received in the enclosed space 80 formed along the left hand side of the upper part 68 of the front portion 64 of the cowling 24. The longitudinal slit 54 in the windshield guide portion 52 is directed toward the right hand side of the cowling front portion 64.

The pair of windshield guide portions 52 and 52' extend parallel to each other along the opposite sides of the windshield assembly 36 and are angled rearwardly of the motorcycle 20 as they extend upwardly from the bight portions 82, thereby defining the path along which the windshield assembly is to travel back and forth between the two limit positions. As will be understood from FIG. 4, the pair of drive ball assemblies 40 and 40' also travel through these windshield guide portions, in addition to through the bight portions 82 and 82' and end portions 84 and 84', as the windshield assembly is moved toward the phantom upper limit position from the solid line lower limit position.

It is an important feature of this invention that the first pair of guide tubes 48 and 48', particularly their windshield guide portions 52 and 52', as well as the second pair of guide tubes 50 and 50' to be detailed subsequently, are disposed on both sides of the motorcycle frame 22 and windshield assembly 36. So disposed, the guide tube means 48 and 48' afford the motorcycle driver the full field of view forwardly of the vehicle through the windshield 37.

As an additional advantage, less installation limitations are imposed on the guide tube means 48 and 48' disposed on both sides of the motorcycle frame than if such guide tube means or equivalents thereof are arranged on the front part of the cowling as in the noted prior art. Therefore, even if the stroke of the windshield assembly 36 is made very long, the guide tube means of correspondingly increased length may be arranged without any sharp curves or bend, making it possible for the drive ball assemblies 40 and 40' to travel therethrough without any excessive frictional resistance. No great force will be required for moving the drive assemblies through the guide tube means and hence for adjusting the height of the windshield assembly 36.

It is also noteworthy that the windshield guide portions 52 and 52' of the first pair of guide tubes 48 and 48' extend substantially rectilinearly, rather than being curved in conformity with the curvature of the front portion 64 of the cowling 24 in a vertical plane. In all the known devices known to the applicant, the windshield has been guided along the curvature of the cowling front portion. This conventional curved path is objectionable because the windshield when elevated becomes angled too much toward the vehicle driver. The substantially rectilinear windshield guide portion 52 and 52' in accordance with the invention is effective to hold the windshield 37 at a constant angle with respect to the driver in any position on its stroke.

B. Second Pair of Guide Tubes

FIG. 4 best illustrates the representative left hand one of the second pair of guide tubes 50 and 50' although they are both seen in part in FIG. 5. The representative second guide tube 50 is shown to comprise two sections 88 and 90 coupled end to end to form an essentially unitary length of tube. The first section 88 of the second guide tube 50 is shorter than its second section 90, which in turn is shorter than the first guide tube 48. Approximately straight, the first section 88 has its end 92 held opposite the end 94 of the first guide tube 48 with a spacing therebetween to expose part of the drive ball assembly 40. The thus exposed part of the drive ball assembly 40 is engaged by the drive wheel 46 thereby to be longitudinally displaced back and forth within the guide tube means 38. The other end portion 96 of the first section 88 is tapered and pressfitted in one end portion 98 of the second section 90 of the second guide tube 50.

The first section 88 of the second guide tube 50 is angled upwardly as they extend rearwardly from the end 94 of the first guide tube 48. Thus the end portion 84 of the first guide tube 48 is at an obtuse angle to the first section 88 of the second guide tube 50, with the result that the drive ball assembly 40 is bent around the drive wheel 46 for positive driven engagement therewith.

The second section 90 of the second guide tube 50 has its end portion 98 tightened against the end portion 96 of the first section 88 by a clamp band 100. So joined end to end, the first and second sections 88 and 90 of the second guide tube 50 depict a gentle curve in a plane parallel to the median plane M—M to provide a greater stroke for the drive ball assembly 40 and, therefore, for the windshield assembly 36 with a minimum of installation space requirement. The second section 90 is secured to the cowling 24 or motorcycle frame 22 by several clamps 102 in longitudinally spaced apart positions thereon. Similar means, not shown, may be provided for fastening the first section 88 of the second guide tube 50 to the cowling or motorcycle frame.

IV. Drive Ball Assemblies

While the pair of drive ball assemblies 40 and 40' are seen in FIGS. 3, 4, 5, 8 and 11, the representative drive ball assembly 40 is best illustrated on an enlarged scale in FIG. 9. Before proceeding further with the detailed description of the drive ball assemblies, it may be pointed out that each drive ball assembly together with the associated guide means is not new but is disclosed in U.S. patent application Ser. No. 832,241 filed Feb. 24, 1986, by Miyauchi et al., now patented (U.S. Pat. No. 4,656,780). In that application one drive ball assembly together with guide means is adapted for use as a vehicle window regulator.

With particular reference to FIG. 9 the representative drive ball assembly 40 broadly comprises a linear flexible element 104 and a series of balls 106 strung thereon in close contact with one another. The linear flexible element 104 should be of nonextensible material, preferably steel wire. While the balls 106 may be of any such rigid material as metal or plastic, a rigid plastic is preferred because it is less in weight than metal.

Threaded through holes 108 in the balls 106, the flexible element 104 has its opposite extremities anchored to a pair of rings or like terminal enlargements 110 and 112. One extremity 114 of the flexible element 104 is threaded through a connector 116 and is affixed to the enlargment 110, so that the balls 106 are restrained from running off this extremity of the flexible element. The connector 116 serves to connect the drive ball assembly 40 to one side of the windshield assembly 36 to cause the joint displacement of the latter with the former, as will be detailed subsequently.

The other extremity 118 of the flexible element 104 is coupled to the enlargement 112 after being threaded successively through bores 120 and 122 in a pair of opposed spring retainers 124 and 126 of cylindrical shape complete with flanges 128 and 130. These flanges serve as seats for a helical compression spring 132 which is sleeved upon the cylindrical bodies of both spring retainers 124 and 126. It is thus seen that the balls 106 are spring preloaded into close contact with one another, thereby remaining at constant pitch distances for proper positive engagement with the drive wheel 46.

V. Drive Mechanism for Drive Ball Assemblies

The drive mechanism 42 for synchronously driving the pair of drive ball assemblies 40 and 40' is shown in FIGS. 2, 3, 4, 5 and 8. It is to be understood that the single drive mechanism 42 serves both drive ball assemblies 40 and 40', so that all its components will be described.

The drive mechanism 42 comprises the pair of drive wheels 46 and 46' nonrotatably mounted on a drive shaft 134 extending transversely of the motorcycle 20 and rotatably supported by its frame 22 in any convenient manner. FIG. 4 best illustrates that the drive wheels 46 and 46' are disposed at the junctions between the first 48 and 48' and second 50 and 50' pairs of guide tubes. The drive wheels 46 and 46' have series of concavities 136 and 136' formed circumferentially therein for driving engagement with the balls 106 and 106' of the drive ball assemblies 40 and 40' as such balls are exposed through the spacings between the first and second pairs of guide tubes.

The drive shaft 134 extends through, and is driven by, the motor drive unit 44 comprising a reversible electric drive motor and speed reducer. The motor drive unit 44 is firmly attached to a mounting plate 138 which in turn is bolted at 140 to the mounting lugs 62, complete with the holes 64, on the left hand branch frame member 58 of the motorcycle frame 22.

Preferably, the drive wheels 46 and 46' may be enclosed in drive wheel housings secured to the motorcycle frame 22. The drive wheel housings are not shown in the drawings but are disclosed in the noted U.S. application Ser. No. 832,241. Each drive wheel housing has defined therein a curved guideway, extending around part of the circumference of the drive wheel 46 or 46', for the drive ball assembly 40 or 40'. The opposed ends of the first 48 and 48' and second 50 and 50' pairs of guide tubes may be coupled directly to the drive wheel housings in open communication with the curved guideways. Sliding through these curved guideways in the drive wheel housings, the drive ball assemblies 40 and 40' will be guided into positive engagement with the drive wheels 46 or 46'.

Thus, with the bidirectional rotation of the pair of drive wheels 46 and 46' with the motor drive unit 44, the pair of drive ball assemblies 40 and 40' conjointly travel back and forth through the pair of guide tube means 38 and 38'. A switch, not shown, is provided within easy reach of the motorcycle driver for controlling the direction of the rotation of the motor drive unit 44 and, in consequence, of the travel of the windshield assembly 36 along the windshield guide portions 52 and 52' of the first pair of guide tubes 48 and 48'.

VI. Windshield Assembly

Figure 11:
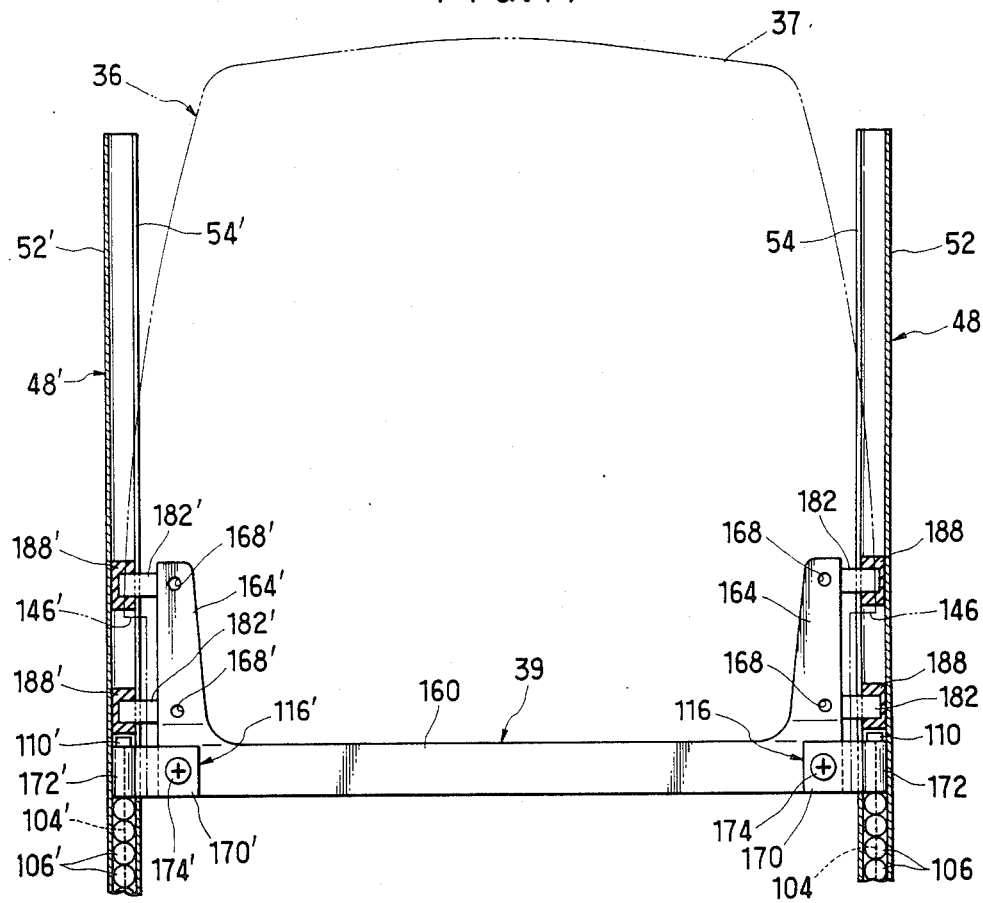
FIG. 11 is a fragmentary front veiw, partly sectioned for clarity, of the windshield apparatus, showing in particular how the windshield assembly has its opposite sides coupled to the pair of drive ball assemblies in the guide tube means and further slidably supported by the guide tube means.
Figure 12:
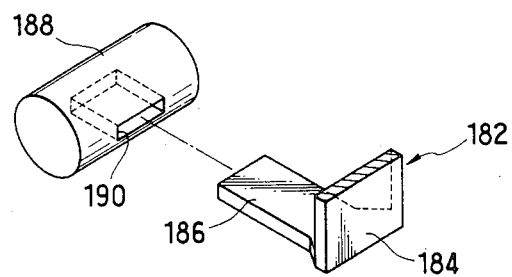
FIG. 12 is an enlarged, fragmentary, exploded perspective view of one of the slider means by which the windshield is slidably supported by the windshield guide portions of the guide tube means.

The windshield assembly 36 appears in all but FIGS. 9 and 12 of the attached drawings, but reference may be had principally to FIGS. 3, 8, 10 and 11. Broadly comprising the windshield 37 and windshield frame 39, the windshield assembly 36 is disposed just behind the upper part 68 of the front portion 64 of the cowling 24 and across the median plane M—M of the motorcycle 20, for up and down movement relative to the cowling along the path defined by the windshield guide portions 52 and 52' of the first pair of guide tubes 48 and 48'.

A. Windshield

The windshield 37 takes the form of a pane or panel of transparent material, preferably a plastic, that is substantially rectangular in shape, slightly tapering upwardly. The upper part 142 of the windshield 37 is curved forwardly, whereas the remaining major portion of the windshield is curved in conformity with the curvatures of the upper part 68 of the cowling front portion 64 in both vertical and horizontal directions.

Being substantially rectangular in shape, the windshield 37 has a pair of opposite sides 144 and 144' extending along the windshield guide portions 52 and 52' of the first pair of guide tubes 48 and 48'. A pair of recesses 146 and 146' are formed in lower parts of the windshield sides 144 and 144'. Also, two pairs of longitudinally spaced clearance holes 148 and 148' are formed adjacent the windshield sides 144 and 144' for receiving screws 150 and 150' by which the windshield frame 39 is fastened to the windshield 37.

B. Windshield Frame

Made of sheet metal material, the windshield frame 39 is rigidly attached to the windshield 37 in order to connect the windshield 37 of plastic material to the pair of drive ball assemblies 40 and 40' and, additionally, to slidably support the windshield on the windshield guide portions 52 and 52' of the first pair of guide tubes 48 and 48'.

The windshield frame 39 is generally U shaped, comprising a bottom limb 160 extending along the bottom edge 162, FIG. 8, of the windshield 37, and a pair of side limbs 164 and 164' extending along the opposite sides 144 and 144' of the windshield. The bottom limb 160 is curved with approximately the same radius as the curvature of the windshield 37 in a horizontal plane. The side limbs 164 and 164' are each curved with approximately the same radius as the curvature of the windshield 37 in a vertical plane. The side limbs 164 and 164' are joined to the bottom limb 160 with offsets 166 and 166' such that the bottom limb is displaced rearwardly of the plane of the side limbs.

The pair of side limbs 164 and 164' of the windshield frame 39 have pairs of screw holes 168 and 168' formed therein. As will be noted from FIG. 3, the bottom limb 160 of the windshield frame 39 is shorter than the bottom edge of the windshield 37 to such an extent that when the windshield frame is placed behind the windshield as in this figure, the holes 168 and 168' in the windshield frame come into register with the clearance holes 148 and 148' in the windshield 37. The windshield 37 and windshield frame 39 are rigidly fastened together as the screws 150 and 150', which may be of self tapping type, are inserted into and through the clearance holes 148 and 148' in the windshield and engaged in the holes 168 and 168' in the windshield frame.

VII. Connections of Windshield Assembly to Drive Ball Assemblies

For connecting the windshield assembly 36 to the pair of drive ball assemblies 40 and 40' there are provided the pair of connectors 116 and 116' which have been mentioned in the course of the previous detailed description of the drive ball assemblies. The connectors 116 and 116' are seen in FIGS. 3, 4, 5, 8, 9, 10 and 11.

As will be best understood by referring to FIGS. 8, 9 and 11, the representative left hand connector 116 comprises an arm 170 in the form of a rectangular piece of sheet metal, and an anchor portion 172 of cylindrical shape formed on the left hand end of the connector arm 170 in one piece therewith. The connector arm 170 is proximally fastened to the left hand side of the windshield assembly 36 by a self tapping screw 174 extending through a clearance hole 176 in the connector arm and engaged in a hole 178 formed adjacent the left hand end of the bottom limb 160 of the windshield frame 39.

Thus protruding laterally from the left hand side of the windshield assembly 36, the connector arm 170 extends into the windshield guide portion 52 of the first guide tube 48 through its longitudinal slit 54. The cylindrical anchor portion 172 on the distal end of the connector arm 170 is received in the first guide tube for longitudinal sliding motion therein. As shown in both FIGS. 4 and 9, the anchor portion 172 of the connector 116 has a bore 180 formed axially therethrough. The the linear flexible element 104 of the drive ball assembly 40 has its extremity 114 inserted into and through the bore 180 and fastened to the terminal enlargement 110.

It is thus seen that the pair of drive ball assemblies 40 and 40' are coupled each at one end to the opposite sides of the windshield assembly 36 via the pair of connectors 116 and 116'. Accordingly, the windshield assembly 36 travels up and down along the windshield guide portions 52 and 52' of the first pair of guide tubes 48 and 48' with the joint longitudinal displacement of the pair of drive ball assemblies 40 and 40' through the guide tube means 38 and 38'.

VIII. Guiding of Windshield Assembly

A study of FIGS. 3, 4, 8, 11 and 12 will make clear how the windshield assembly 36 is guided along the windshield guide portions 52 and 52' of the first pair of guide tubes 48 and 48'. As best shown in FIGS. 8 and 11, the representative left hand side limb 164 of the windshield frame 39 has one or more, preferably two, outriggers 182 formed in one piece therewith and with a spacing therebetween in the longitudinal direction of the side limb.

FIG. 12 shows the construction of each outrigger 182 in detail. Each outrigger 192 is L shaped, comprising a proximal portion 184 bent rearwardly from the windshield frame limb 164, and a distal portion 186 bent right angularly from the rear end of the proximal portion to extend with clearance through the slit 54 into the windshield guide portion 52 of the first guide tube 48. It will be noted from FIG. 8 that the proximal portion 184 of the lower outrigger 182 is shorter than that of the upper outrigger to such an extent that the distal portion 186 of the lower outrigger is on the plane containing the distal portion of the upper outrigger and the left hand end portion of the bottom limb 160 of the windshield frame 39.

The distal portions 186 of the outriggers 182 are coupled to sliders 188 slidably engaged in the windshield guide portion 52 of the first guide tube 48. Each slider 188 is shown as a cylindrical piece of rubber or like elastic material, having a slot 190 defined radially in its surface for snugly receiving the distal portion 186 of one outrigger 182.

The foregoing will have made clear that the windshield assembly 36 has its opposite sides slidably supported by the windshield guide portions 52 and 52' of the first pair of guide tubes 48 and 48' via the two pairs of outriggers 182 and 182' carrying the sliders 188 and 188'. It is a pronounced feature of this invention that the first pair of guide tubes 48 and 48' serve for guiding not only the drive ball assemblies 40 and 40' but also the windshield assembly 36. This feature offers two advantages. One is that no guide means exclusively for the windshield assembly is required. The other is that the windshield assembly and the end portions of the drive assemblies coupled thereto, which should follow the same path, actually do so by being both guided by the windshield guide portions 52 and 52'.

According to a further feature of this invention, the cylindrical sliders 188 and 188' of elastic material on the outriggers 182 and 182' are sized to fit in the windshield guide portions 52 and 52' without play in their transverse directions. Since the outriggers are rigidly coupled to the windshield 37, the vibrations of the windshield during the travel of the motorcycle 22 can be reduced to a minimum. Even if the windshield somehow vibrates, the elastic sliders 188 and 188' serve to damp and isolate this vibration from the guide tubes 48 and 48' and other parts of the vehicle rigidly coupled thereto.

IX. Conclusion

Such being the improved construction of the motorcycle windshield apparatus in accordance with the invention, it will be seen that the height of the windshield assembly 36 is adjustable as the pair of drive ball assemblies 40 and 40' are synchronously dirven in either direction by the drive wheels 46. Let us assume that the windshield assembly 36 is now in the lowermost position indicated by the solid lines in FIGS. 3 and 4. The windshield assembly 36 when in this lowermost position has its approximately upper half protruding upwardly beyond the bottom edge of the recess 72 of the cowling 24.

For lifting the windshield assembly 36 from this lowermost position, the motor drive unit 44 may be set into rotation in such a direction as to cause the pair of drive wheels 46 to revolve in a clockwise direction as viewed in FIG. 4. Being positively engaged with the drive wheels 46, the pair of drive ball assemblies 40 and 40' will then jointly travel longitudinally through the guide tube means 38 and 38' in the direction indicated by the solid arrows in FIG. 4. As the leading end portions of the drive ball assemblies 40 and 40' travel upwardly through the rectilinear windshield guide portions 52 and 52' of the first pair of guide tubes 48 and 48', so will the windshield assembly 36 which has its windshield frame 39 rigidly coupled to the drive ball assemblies via the pair of connectors 116 and 116'. This travel of the windshield assembly 36 will be guided by the windshield guide portions 52 and 52' in which are slidably engaged the two pairs of sliders 188 and 188' on the outriggers 182 and 182' projecting from the opposite sides of the windshield assembly.

The motor drive unit 44 may be set out of rotation when the windshield assembly 36 rises to a desired height between the two limit positions. The windshield assembly 36 can, of course, be raised to the uppermost position indicated by the broken lines in FIGS. 3 and 4, in which position the windshield 37 is practically fully exposed through the recess 72 in the cowling 24.

For lowering the windshield assembly 36, the pair of drive wheels 46 and 46' may be revolved in a counterclock direction, as viewed in FIG. 4, by the motor drive unit 44. The pair of drive ball asemblies 40 and 40' will then synchronously travel through the guide tube means 38 and 38' in the direction of the dashed arrows in FIG. 4, with the consequent linear descent of the windshield assembly 36 down the windshield guide portions 52 and 52' of the first pair of guide tubes 48 and 48'.

Although the adjustable height windshield apparatus of this invention has been shown and described hereinbefore as adapted for a two wheeled motorcycle having a cowling, it is to be understood that this represents but one of the numerous possible applications of the invention. Accordingly, the invention is not to be limited by the exact details of the foregoing disclosure since a variety of modifications or alterations are possible within the broad teaching hereof. For instance, the pair of drive wheels may be driven manually, as by a hand crank, instead of by a reversible electric motor. It will also be apparent that only one outrigger, complete with the slider on its distal end, could be provided on each side of the windshield assembly, the anchor portion of the connector coupling the windshield assembly to each drive ball assembly being readily modifiable to serve as the additional slider for guiding the windshield assembly.

What is claimed is:

1. An adjustable height windshield apparatus for a motorcycle having frame means including a cowling of substantially bilateral symmetry with respect to the median plane of the motorcycle, the windshield apparatus comprising:
    (a) a windshield to be disposed across the median plane of the motorcycle for reciprocating movement relative to the cowling and frame means along a predetermined path, the windshield having a pair of opposite sides extending along the predetermined path;
    (b) a pair of guide means to be rigidly mounted behind portions of the cowling on both sides of the frame means of the motorcycle in symmetrical arrangement with respect to the median plane of the motorcycle so as not to obstruct a driver's field of view forwardly of the motorcycle, the guide means including a pair of windshield guide portions which extend along the opposite sides of the windshield and which define the predetermined path of the windshield;

(c) a pair of elongate, flexible drive assemblies slidable longitudinally one along each guide means;

(d) connector means for connecting the opposite sides of the windshield to the pair of drive assemblies, respectively, in order to cause the displacement of the windshield along the predetermined path with the longitudinal movement of the drive assemblies along the guide means; and (e) drive means including a pair of drive wheels to be rotatably mounted to the frame means for driving engagement with the pair of drive assemblies, respectively, the drive wheels being adapted to be jointly revolved bidirectionally to cause the joint longitudinal displacement of the drive assemblies along the guide means and, in consequence, of the windshield back and forth along the windshield guide portions of the guide means.

2. The adjustable height windshield apparatus of claim 1 further comprising a pair of slider means formed on the opposite sides of the windshield and slidably engaged with the pair of windshield guide portions of the guide means, respectively so that the guide means serve the dual purpose of guiding the drive assemblies and the windshield.

3. The adjustable height windshield apparatus of claim 2 wherein each of the pair of the windshield guide portions of the guide means extends rectilinearly.

4. An adjustable height windshield apparatus for a motorcycle having frame means including a cowling of substantially bilateral symmetry with respect to the median plane of the motorcycle, the windshield apparatus comprising:

(a) a windshield to be disposed across the median plane of the motorcycle for reciprocating movement relative to the cowling and frame means of the motorcycle along a predetermined path, the windshield having a pair of opposite sides extending along the predetermined path;

(b) a pair of tubular guide means to be rigidly mounted behind portions of the cowling on both sides of the frame means of the motorcycle in symmetrical arrangement with respect to the median plane of the motorcycle so as not to obstruct a driver's field of view forwardly of the motorcycle, the guide means including a pair of windshield guide portions which extend along the opposite sides of the windshield and which define the predetermined path of the windshield;

(c) a pair of drive ball assemblies engaged one in each tubular guide means for longitudinal sliding movement therethrough, each drive ball assembly comprising a linear flexible element and a series of balls strung thereon;

(d) connector means for connecting the opposite sides of the windshield to the pair of drive ball assemblies, respectively, in order to cause the displacement of the windshield along the predetermined path with the longitudinal movement of the drive ball assemblies through the tubular guide means; and (e) a pair of drive wheels to be rotatably mounted to the frame means for driving the drive ball assemblies through the guide means, each drive wheel having a series of concavities defined circumferentially therein for driving engagement with one of the drive ball assemblies, the drive wheels being adapted to be jointly revolved bidirectionally to cause the joint longitudinal displacement of the drive ball assemblies back and forth along the guide means and, in consequence, of the windshield along the windshield guide portions of the guide means.

5. The adjustable height windshield apparatus of claim 4 wherein the windshield guide portions of the tubular guide means have each a slit formed longitudinally therein, and wherein the apparatus further comprises a pair of slider means extending from the opposite sides of the windshield and slidably engaged one in each of the windshield guide portions of the tubular guide means via the longitudinal slit therein, so that the guide means serve the dual purpose of guiding the drive ball assemblies and the windshield.

6. The adjustable height windshield apparatus of claim 5 wherein each slider means comprises:

(a) at least one outrigger having a first end secured to one side of the windshield and a second end received in one windshield guide portion of the guide means; and (b) a slider formed on the second end of the outrigger and slidably fitted in one windshield guide portion of the guide means.

7. The adjustable height windshield apparatus of claim 6 wherein the outrigger of each slider means is of rigid material whereas the slider is of elastic material, and wherein the slider is received in one windshield guide portion of the guide means without play in transverse directions of the windshield guide portion in order to minimize the vibration of the windshield during the travel of the motorcycle.

8. The adjustable height windshield apparatus of claim 7 wherein the slider of each slider means is in the shape of a cylinder having a slot formed therein for snugly receiving the second end of the outrigger.

9. The adjustable height windshield apparatus of claim 4 wherein each of the pair of the windshield guide portions of the guide means extends rectilinearly.

10. The adjustable height windshield apparatus of claim 4 wherein the windshield guide portions of the tubular guide means have each a slit formed longitudinally therein, and wherein the connector means comprises a pair of connector arms extending laterally from the opposite sides of the windshield and slidably engaged one in each windshield guide portion of the guide means via the longitudinal slit therein, each connector arm having one extremity of one drive ball assembly coupled thereto.

11. The adjustable height windshield apparatus of claim 10 wherein each connector arm of the connector means has a first end secured to the windshield and a second end formed into an anchor portion of cylindrical shape which is slidably fitted in one windshield guide portion of the guide means.

12. The adjustable height windshield apparatus of claim 11 wherein the cylindrical anchor portion of each connector arm of the connector means has a bore formed axially therethrough for receiving one extremity of the linear flexible element of one drive ball assembly.

13. The adjustable height windshield apparatus of claim 4 wherein the balls of each drive ball assembly are locked against running off one extremity of the linear flexible element, and wherein each drive ball assembly further comprises:

(a) a first spring retainer to which another extremity of the linear flexible element is secured;

(b) a second spring retainer having a bore formed therein to to permit the linear flexible element to extend loosely therethrough, the second spring retainer being disposed opposite the first spring retainer and next to the series of balls; and (b) a spring mounted between the first and second spring retainers for preloading the balls into close contact with one another.

14. The adjustable height windshield apparatus of claim 4 wherein the balls of the drive ball assemblies are made of a rigid plastic, and the linear flexible elements of the drive ball assemblies are wire.

15. In a motorcycle having a median plane, in combination:

(a) frame means including a cowling facing forwardly of the motorcycle;

(b) the first pair of guide tubes rigidly mounted to the frame means and including a pair of windshield guide portions disposed just behind the cowling and on opposite sides of the median plane in parallel relation thereto so as not to obstruct a driver's field of view forward of the motorcycle, the windshield guide portions having each defined therein a longitudinal slit and extending from first ends of the guide tubes toward second ends thereof;

(c) a second pair of guide tubes rigidly mounted to the frame means and each having a first end held opposite the second end of one of the first pair of guide tubes with a spacing therebetween;

(d) a pair of drive ball assemblies each received in one of the first pair of guide tubes and one of the second pair of guide tubes for longitudinal sliding movement therethrough, each drive ball assembly comprising a linear flexible element and a series of balls strung thereon and being partly exposed through the spacing between the second end of one of the first pair of guide tubes and the first end of one of the second pair of guide tube;

(e) a windshield disposed between the windshield guide portions of the first pair of guide tubes and having a pair of opposite sides coupled respectively to the pair of drive ball assemblies through the longitudinal slits in the windshield guide portions for movement with the drive ball assemblies back and forth along the windshield guide portions;

(f) slider means extending from the opposite sides of the windshield and slidably engaged in the windshield guide portions of the first pair of guide tubes via the longitudinal slits therein, so that the windshield is guided by and along the windshield guide portions; and (g) a pair of drive wheels rotatably mounted to the frame means and disposed between the second ends of the first pair of guide tubes and the first ends of the second pair of guide tubes for driving engagement with the balls of the pair of drive ball assemblies, respectively, the drive wheels being effective, when jointly revolved bidirectionally, to cause the joint longitudinal displacement of the drive ball assemblies through the first and second pairs of guide tubes and, in consequence, of the windshield back and forth along the windshield guide portions of the first pair of guide tubes.

16. The motorcycle of claim 15 wherein at least portions of the first pair of guide tubes adjacent the second ends thereof are arranged at an angle to at least portions of the second pair of guide tubes adjacent the first ends thereof in order to bend the drive ball assemblies around the drive wheels.

17. The motorcycle of claim 15 further comprising a reversible electric motor mounted to the frame means for imparting bidirectional rotation to the pair of drive wheels.

* * * * *